BURT & HILDRETH.
Ratchet Attachment for Harvesters.
No. 84,475.
Patented Dec. 1, 1868.
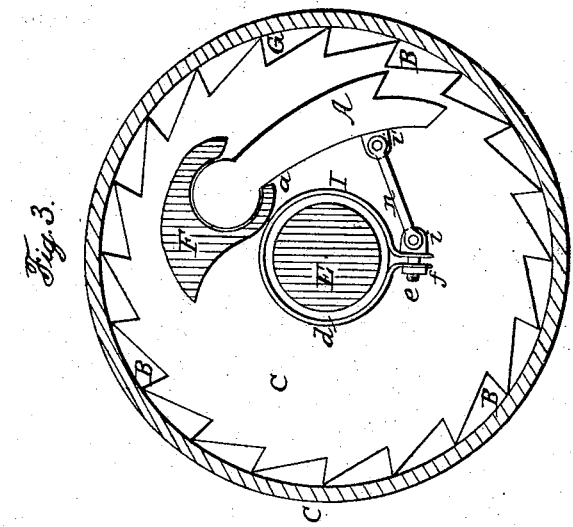
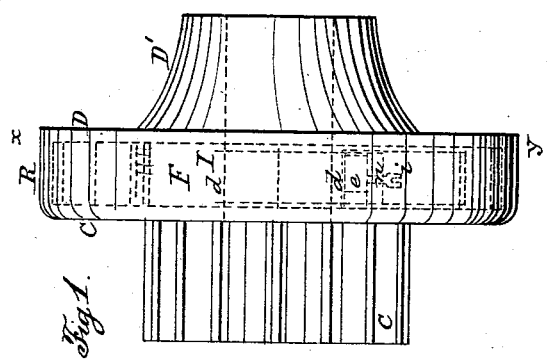
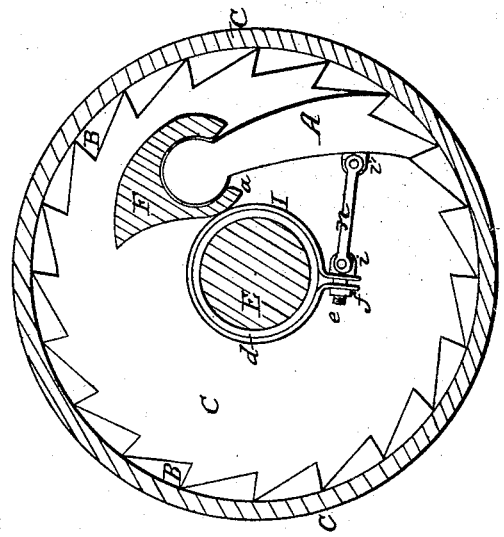
Inventors
George E. Burt
Stanley B. Hildreth
Witnesses
E. A. Hildreth
A. L. Burt

United States Patent Office.

GEORGE E. BURT AND STANLEY B. HILDRETH, OF HARVARD, MASSACHUSETTS.

Letters Patent No. 84,475, dated December 1, 1868; antedated June 2, 1868

IMPROVEMENT IN RATCHET-ATTACHMENT FOR HARVESTERS.

The Schedule referred to in these Letters Patent and making part of the same.

*To all whom it may concern:*

Be it known that we, GEORGE E. BURT and STANLEY B. HILDRETH, both of the town of Harvard, county of Worcester, and State of Massachusetts, have invented a new and useful Improvement in Ratchet-Attachment for Harvesters; and we do hereby declare that the following is a full and exact description thereof, reference being had to the accompanying drawings, and to the letters of reference marked thereon, in which—

Figure 1 is a view of the ratchet complete.

Figure 2 is a vertical transverse section through the line $x\ y$, showing the pawl engaged with the teeth.

Figure 3 is a similar section, showing the pawl disengaged from the teeth.

Like letters represent like parts in all the figures.

R is the ratchet, constructed of two half cases.

C is the outside case, provided with ratchet-teeth B B, cogs $c\ c$, and an inward-projecting hub, $d$, shown in figs. 2 and 3, and by the red dotted lines in fig. 1, which is made to fit and turn freely on the shaft E.

D is the inside case, which is firmly fixed to the shaft E, and constructed with outward-projecting hub D' and pawl-seat F, shown in all the figures. Or the pawl A may be made to turn on a pivot secured firmly to the case D, and the pawl A resting on a stop, when disengaged from the teeth B B.

I is a friction-band, constructed with its ends bent outwards, and is made to surround the hub $d$, and embrace it, by means of the screw-nut $f$ and bolt $e$.

$n$ is a link that connects the pawl A with the friction-band I, by means of ears $i\ i'$ and their pivots.

These ratchets may be constructed both right and left.

Operation.

When a pair of these ratchets is attached to the same shaft, and connected with the driving-gearing of a harvester, mounted on wheels in the usual manner, and both wheels revolve at the same speed, the pawls A A engage with the teeth B B, and the gears $c\ c$ are made to revolve by the propelling-force of the driving-wheels; thus both wheels propel the cutter-bar.

But if the team move in a curve, and one of the propelling-wheels revolves faster than the other, the faster-revolving wheel always propels the cutter-bar, and the cogs $c\ c$ being engaged with the slower-moving wheel, the inside case D is revolved at a greater speed than the outside case C. This difference in the speed of the separate cases or parts, (the pawl A being held in position by the seat F, which is firmly fixed to the case, D,) causes the seat F and the ear $i$ to recede from each other, and the pawl A being connected to the friction-band I by the ears $i'\ i$ and their pivots, and the link $n$, a force is exerted on the link $n$ equal to the friction of the band I on the hub $d$. The link $n$ being connected with the pawl A, this force acts on the pawl A to pull it inward, and as the case D moves at a greater speed than the case C, the pawl A is silently but effectually disengaged from the teeth B, and rests on the seat F at $a$.

When the team moves in a curve in the opposite direction, the action of the parts is reversed, and as the case C revolves now more rapidly than the case D, the friction-band I presses back on the link $n$ with a force equal to the friction, and the pawl A is instantly lifted by that force, and brought into position to engage with the teeth B B in a very quiet but positive manner, thus avoiding the clatter caused by the pawls when acted on by springs, and the consequent wear of the pawls on the teeth, when held in position by springs.

If the friction-band I should become loose by wear, it is readily tightened by turning up the bolt $e$ in the nut $f$, so that any degree of friction may be had on the band, to operate the pawl positively.

The above device can be applied to most harvesters now in use.

What we claim as new, and desire to secure by Letters Patent, is—

1. A loose collar or ring, in combination with the pawl, when the pawl is connected to the collar or ring in such a manner as to be operated in and out of the surrounding or covering internal ratchet-gear, by the resistance arising from the inertia or friction of the collar or ring, operating substantially as described, for the purpose set forth.

2. The bolt $e$ and tightening-nut $f$, in combination with the friction-band I and hub $d$, when said friction-band is used to operate the pawl in and out of cog, substantially as described.

3. The combination of the pawl A, the pivot-ears $i\ i'$, the link $n$, and the friction-band I, substantially as described, for the purpose set forth.

GEORGE E. BURT.
STANLEY B. HILDRETH.

Witnesses:
E. A. HILDRETH,
A. C. BURT.